United States Patent [19]
Lynch et al.

[11] Patent Number: 5,766,774
[45] Date of Patent: Jun. 16, 1998

[54] MOLDED CORE COMPONENT

[75] Inventors: Steven K. Lynch, St. Charles; Mark A. Ruggie, Lombard; William P. Hoel, Crystal Lake, all of Ill.

[73] Assignee: Masonite Corporation, Chicago, Ill.

[21] Appl. No.: 332,938

[22] Filed: Nov. 1, 1994

Related U.S. Application Data

[63] Continuation-in-part of Ser. No. 262,472, Jun. 20, 1994, Pat. No. 5,543,234.

[51] Int. Cl.⁶ ................................................ B32B 9/00
[52] U.S. Cl. .................... 428/537.1; 428/109; 428/156; 428/171; 428/248; 428/281; 428/286; 428/290; 428/326; 428/535; 428/542.8; 264/112; 264/113; 264/120; 264/316
[58] Field of Search ........................... 428/109, 156, 428/171, 248, 537.1, 281, 290, 286, 535, 326, 542.8; 264/113, 120, 316, 112, 122, 267, 266, 511

[56] References Cited

U.S. PATENT DOCUMENTS

| | | | |
|---|---|---|---|
| Re. 24,558 | 10/1958 | Tyree | 189/46 |
| 937,430 | 10/1909 | Evans, Jr. | |
| 2,511,620 | 6/1950 | Clements | 20/91 |
| 2,644,777 | 7/1953 | Havens | 154/45.9 |
| 2,831,688 | 4/1958 | Knox | 272/66 |
| 2,992,151 | 7/1961 | Niessen | 154/43 |
| 3,287,855 | 11/1966 | Hallonquist | 49/503 |
| 3,366,530 | 1/1968 | Kodich | 161/68 |
| 3,385,002 | 5/1968 | Quinif | 49/501 |
| 3,461,632 | 8/1969 | Kuhne | 52/615 |
| 3,525,663 | 8/1970 | Hale | 161/68 |
| 3,527,664 | 9/1970 | Hale | 161/68 |
| 3,597,891 | 8/1971 | Martin | 52/145 |
| 3,616,025 | 10/1971 | Fairbanks | 156/257 |
| 3,617,416 | 11/1971 | Kromrey | 156/173 |
| 3,635,784 | 1/1972 | Snitker | 161/43 |
| 3,775,234 | 11/1973 | Rich | 161/68 |
| 3,834,487 | 9/1974 | Hale | 181/33 G |
| 3,876,492 | 4/1975 | Schott | 161/68 |
| 3,898,120 | 8/1975 | Snitker | 156/284 |
| 3,938,963 | 2/1976 | Hale | 29/191.4 |
| 4,049,855 | 9/1977 | Cogan | 428/116 |
| 4,148,857 | 4/1979 | Wheeler | 264/87 |
| 4,175,150 | 11/1979 | Luck et al. | 428/171 |
| 4,236,365 | 12/1980 | Wheeler | 52/455 |
| 4,265,067 | 5/1981 | Palmer | 52/309.9 |
| 4,305,989 | 12/1981 | Luck et al. | 428/171 |
| 4,583,338 | 4/1986 | Sewell et al. | 52/456 |
| 4,630,420 | 12/1986 | Hagemeyer | 52/313 |
| 4,811,538 | 3/1989 | Lehnert et al. | 52/455 |
| 4,906,508 | 3/1990 | Blankenburg et al. | 428/116 |
| 4,922,660 | 5/1990 | Omelchuk | 49/395 |
| 4,935,281 | 6/1990 | Tolbert et al. | 428/116 |
| 5,030,501 | 7/1991 | Colvin et al. | 428/178 |
| 5,167,105 | 12/1992 | Isban et al. | 52/455 |
| 5,242,735 | 9/1993 | Blankenburg et al. | 428/116 |
| 5,264,062 | 11/1993 | Ohsumi et al. | 156/228 |
| 5,266,379 | 11/1993 | Schaeffer et al. | 428/178 |
| 5,401,556 | 3/1995 | Ishitoya et al. | 428/109 |
| 5,439,749 | 8/1995 | Klasell et al. | 428/537.1 |
| 5,543,234 | 8/1996 | Lynch et al. | 428/537.1 |

*Primary Examiner*—Patrick Ryan
*Assistant Examiner*—Abraham Bahta
*Attorney, Agent, or Firm*—Marshall, O'Toole, Gerstein, Murray & Borun

[57] ABSTRACT

A molded core component includes a center plane piece and at least one wall extending from the center plane piece. The wall preferably includes contours which form a multiplicity of pods, cells, or protrusions integral with the center plane piece. The core component is preferably inserted into the space or void formed by two prefabricated molded fiberboard doorskins, wherein the center plane piece lies substantially in the central plane of the door product. Processes for the production of a molded core component and a composite door product are also disclosed.

33 Claims, 3 Drawing Sheets

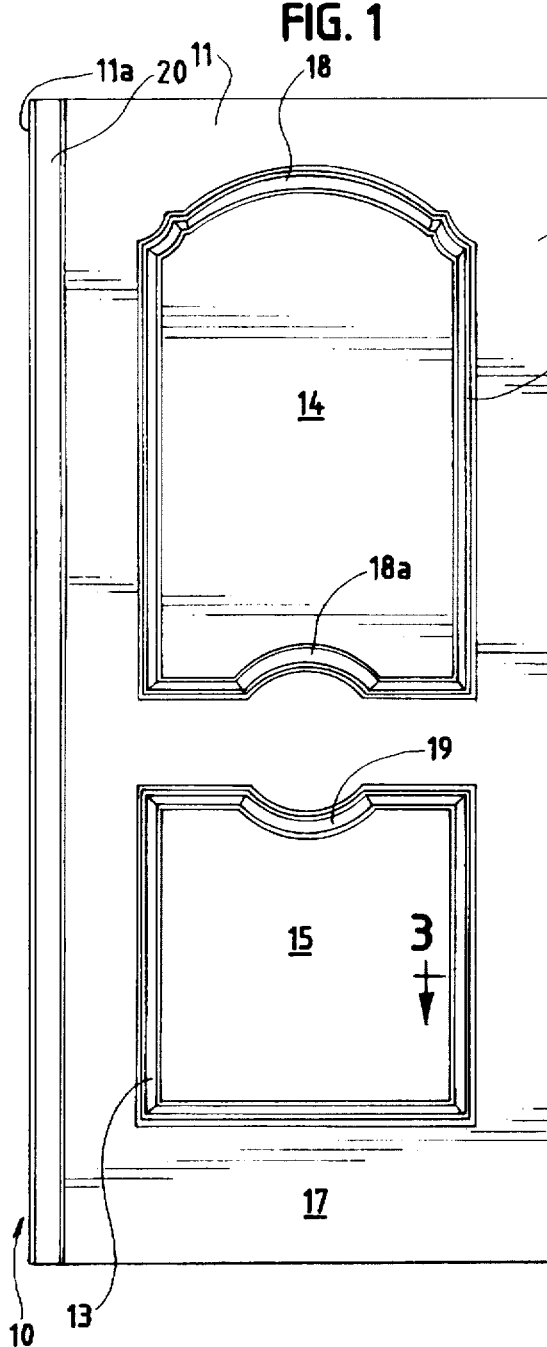
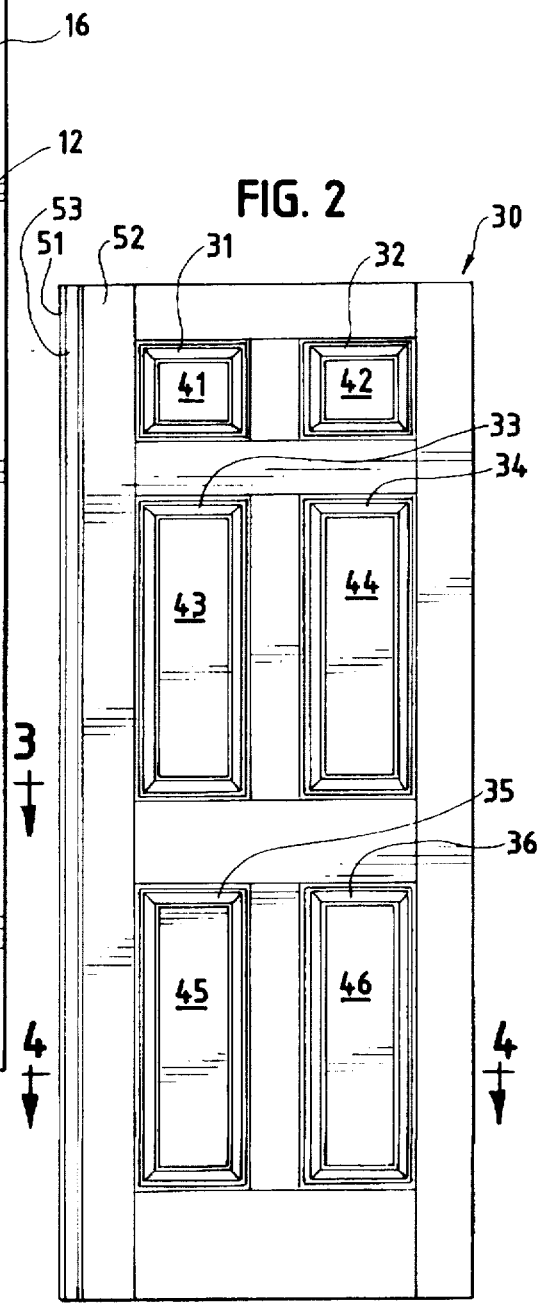

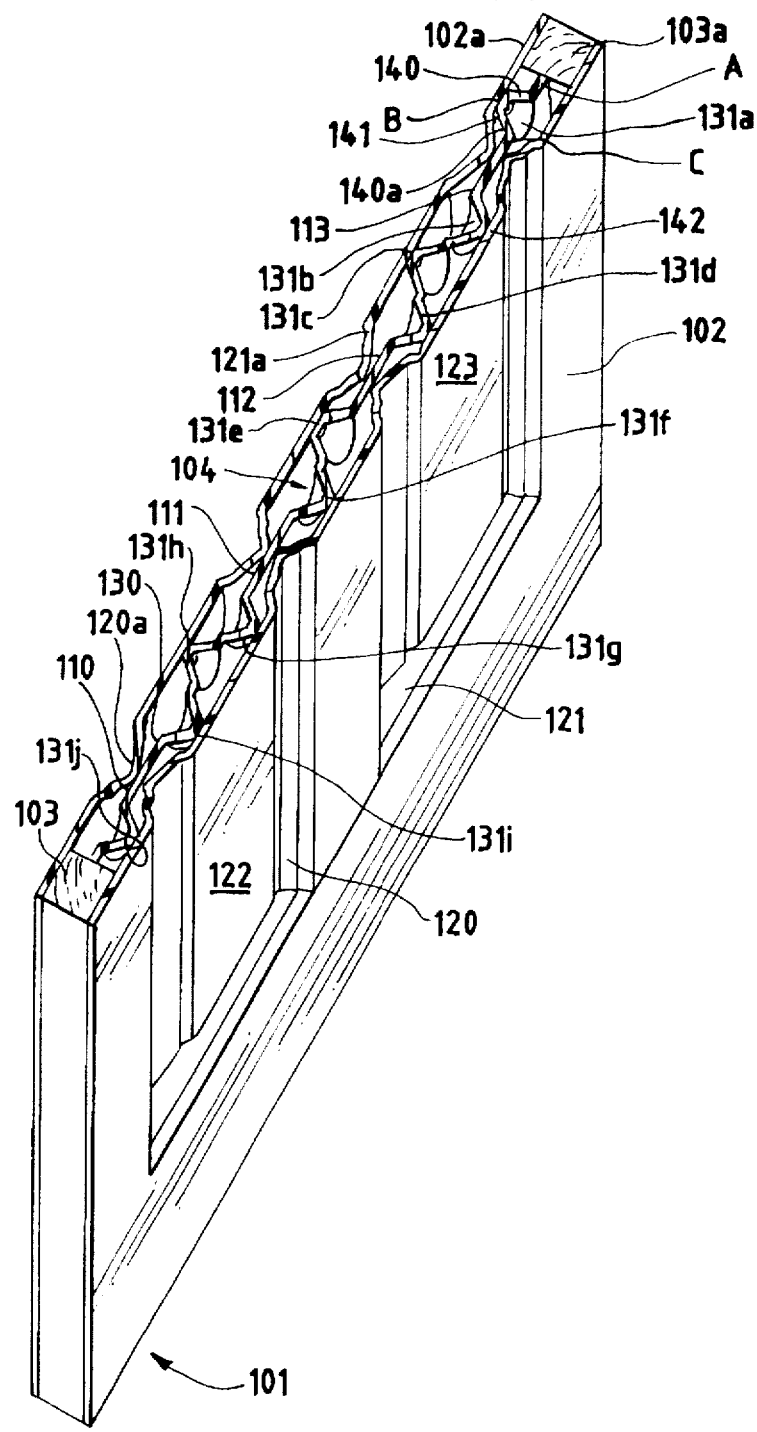

MOLDED CORE COMPONENT

CROSS REFERENCE TO RELATED APPLICATION

This application is a continuation-in-part of application Ser. No. 08/262,472 filed Jun. 20, 1994, now U.S. Pat. No. 5,543,234.

BACKGROUND OF THE INVENTION

1. Field of the Invention

The invention relates generally to the production of man-made composite structural and building products. More particularly, the invention relates to the production of a molded core component which can be utilized, for example, in an interior space or void formed by man-made composite doorskins, e.g., fiberboard doorskins.

2. Brief Description of Related Technology

Man-made boards, such as fiberboard, can be embossed or molded to have a three-dimensional shape and various design and structural features found in natural wood. Types of useful man-man boards are referred to by the following terms, for example: (a) fiberboards such as hardboard, softboard, medium-density fiberboard, and low-density hardboard and (b) chipboards such as particleboard, medium-density particleboard, oriented strandboard ("OSB"). Composites of these boards are also useful. Such boards, particularly hardboard, have found widespread use in the manufacture of doorskins, which can be glued together or laminated to support or enclose a structure or a frame.

Commonly, such doorskin products (also referred to as door faces) are molded from a planar cellulosic mat to include one or more interior depressions or contours, such as one or more square or rectangular depressions which do not extend to the outer edge or periphery of the doorskin product. Where the depressions or contours are included on a doorskin product, this can serve to replicate a more expensive natural wood paneled door. For example, doors having 2, 3, 4, 5, and 6 panel designs are commonly produced. A doorskin that simulates a multi-panel natural wood door on both major faces can be mounted on a support substrate or frame member, comprising, for example, stiles and rails. The exterior or visible surfaces of the fiberboard also can be embossed with a design which represents a wood grain pattern found in a natural piece of wood. Doorskins often require inclined molded walls having a plurality of contours that include varied curved and planar surfaces.

The principal processes for the manufacture of wood composites such as doorskins and other structural or building products include (a) wet felted/wet pressed or "wet" processes, (b) dry felted/dry pressed or "dry" processes, and (c) wet felted/dry pressed or "wet-dry" processes.

Generally in a wet process, cellulosic fillers or fibers (e.g., woody material which is subjected to fiberization to form wood fibers) are blended in a vessel with large amounts of water to form a slurry. The slurry preferably has sufficient water content to suspend a majority of the wood fibers and preferably has a water content of at least 90 percent by weight ("weight percent"). The slurry is deposited along with a synthetic resin binder, such as a phenol-formaldehyde resin, onto a water-pervious support member, such as a fine screen or a Fourdrinier wire, where much of the water is removed to leave a wet mat of cellulosic material having, for example, a moisture content of about fifty weight percent. The wet mat is transferred from the pervious support member to a press and consolidated under heat and pressure to form the molded wood composite.

A wet-dry forming process can also be used to produce wood composites. Preferably, a wet-dry process begins by blending cellulosic or wood fiber raw material in a vessel with large amounts of water having a pH of less than 7 to form a slurry. This slurry is then blended with the resin binder. The blend is then deposited onto a water-pervious support member, where a large percentage (e.g., 50 percent or more) of the water is removed, thereby leaving a wet mat of cellulosic material having a water content of about 40 wt.% to about 60 wt. %, for example. This wet mat is then transferred to an evaporation zone where much of the remaining water is removed by evaporation. The dried mat preferably has a moisture content of less than about 10 wt. %. The dried mat is then transferred to a press and consolidated under heat and pressure to form the wood composite which may be, for example, a flat board, a doorskin, or any other desired shape depending on the intended use of the product.

In a dry process, the cellulosic fibers are generally conveyed in a gaseous stream or by mechanical means rather than a liquid stream. For example, the cellulosic fibers may be first coated with a thermosetting resin binder, such as a phenol-formaldehyde resin. The fibers are then randomly formed into a mat by air blowing the resin-coated fibers onto a support member. The mat may optionally be subjected to pre-press drying. The mat, typically having a moisture content of less than 30 wt. % and preferably less than 10 wt. %, is then pressed under heat and pressure to cure the thermosetting resin and to compress the mat into an integral consolidated structure.

The fiber mat formed by the above-described methods can be pressed into a pre-selected decorative shape, typically at a thickness of about one-eighth of an inch. In the case of a composite door product, the decorative shape generally includes one or more panels and/or other contours in the doorskin. Two doorskin pieces are typically joined together with an adhesive binder, which is placed at least at the contact points along the periphery of the door assembly formed by the doorskins. Because the doorskin pieces are contoured, an open, interior space of varying dimensions is formed by the doorskin assembly.

Doorskin pieces are typically not used alone, but in conjunction with some other material(s) to add support, weight, and/or soundproofing qualities to the final door product, for example. For example, the doorskin pieces often utilize wood framing at or near the perimeter of the assembled doorskin. It is known to use rails and stiles, which, when attached together, can provide additional structural support for the door. Rails can be generally described as horizontally-oriented beams which provide support for the door. Stiles, on the other hand, can be generally described as longitudinal or vertically-oriented beams which provide support for the door. In addition, a lock block is optionally utilized to provide further support for a door handle and/or a locking mechanism (e.g., a so-called "dead bolt") at the periphery of the door. The lock block is preferably secured to a stile and/or a rail.

However, although a man-made composite door product such as that described above can be provided with support via rails and stiles, often the door still will not perform as well as a natural wood door because the interior spaces defined by the doorskins will be substantially hollow or empty. The hollow spaces or voids cause the man-made door to be lighter than is generally preferred. Further, it is sometimes found that the sound insulation provided by such doors is not entirely satisfactory. Thus, it is typically necessary to use a core material (e.g., core pieces or components) to fill these hollow spaces. A core material made of cardboard and/or paper can be used, for example.

When manufacturing a core material, it must be kept in mind that the material should be easily secured to the doorskins (e.g., with an adhesive binder), and should ideally provide the door with a relatively even weight distribution.

The core material should also have characteristics (e.g., size and shape) which allows placement and attachment within the interior spaces formed by the doorskin assembly. As described above, doorskins, particularly for paneled doors, are commonly molded to include one or more interior depressions (i.e., on the surface at some distance from the periphery), such as one or more square or rectangular depressions that do not extend to an outer edge of the doorskin. These surface depressions create varying depths (measured from the front to the back of the door) of the interior void formed by a pair of assembled doorskins. When placing a core material or component on the interior of the doorskin assembly, it is therefore necessary to compensate for the varying depth of the interior void. For example, in a rectangular door having an interior void with a depth measuring from 1 inch to 2 inches at different locations, it is clear that one cannot place a rectangular core component having a depth of 2 inches along its entire length, to fill the void.

Further, a suitable core material should provide the door product with a desirable weight, for example the weight of a similarly-styled solid wood door. (A typical 30-inch wide solid pine door weighs approximately 42 pounds.) Known core material and components have the disadvantage, for example, that they often fall far short of the desired weight. Some known materials (e.g., post-machined full thickness particleboard doors) produce a door that is too heavy.

Another problem with known core components is that different styles of door (e.g., 2, 3, 4, 5 or 6 panel models) will all have different patterns of hollow spaces or voids. Thus, a manufacturer has generally been required to have readily available various sizes and patterns of core components for the different models of doors it manufactures. This is undesirable because such a system requires (a) various different machinery (e.g., dies) to make the varying types of core materials and (b) the stocking of multiple sizes of the produced core materials. Such necessities make the manufacturing process more complicated and expensive. It would therefore be desirable to have a single core component design which could be used for multiple designs of doors.

Another problem in manufacturing molded core components is that in stacking a plurality of molded articles for shipment, the articles often have a tendency to damage, particularly in the upper surfaces of the lowermost articles, due to abrasive contact on the depression-interior inclined surfaces. It would be desirable to provide a core component which could be easily stacked or "nested" with other core component pieces, to facilitate more economical shipping and storage of large quantities of core components, and to avoid damage to the articles during shipping.

SUMMARY OF THE INVENTION

It is an object of the invention to overcome one or more of the problems described above.

Accordingly, the invention provides a rigid man-made building component, such as a composite door product, having various improved characteristics. The improved characteristics preferably include, for example, weight properties, increased strength, and improved sound insulation.

The invention also provides a molded core component which can provide beneficial properties to various building components, such as doors. For example, a molded door core component is adapted for placement on the interior of a door exterior or doorskin having interior spaces or voids, so as to provide a composite door with beneficial weight and sound insulation properties. The invention also provides a process of producing such a composite.

In one embodiment, the invention is carried out by forming a mat comprising cellulosic fiber and a synthetic resin. The mat is placed in a press which includes a die set and cured under heat and pressure. The pressing die is preferably designed to form a pressed mat which has one or more contours extending from a center plane. These contours can be described as pods, protrusions or cells.

Once formed, the molded core component can be placed on an interior space or void formed when two man-made composite fiberboard doorskins are joined together to form a door assembly. The molded door core component is preferably secured to the doorskins by an adhesive binder.

In one embodiment of the invention, the molded door core component includes a feature wherein a single design of core component can be utilized in various styles of doorskins. Preferably, this feature includes arranging the pods in a pattern so that a core component having a single arrangement of pods can fit into the hollow spaces or voids found in multiple styles of paneled (e.g., 6-paneled) or contoured doors, for example.

When the inventive core component is utilized in conjunction with a molded exterior body (e.g., a doorskin), the composite product preferably has a desired weight, for example a weight substantially similar to the weight of a solid wood door. Preferably, the invention also includes a feature which allows multiple units of the molded core components to be stacked or "nested" for simple, effective, and economical shipping and storage of the core components.

Further objects and advantages of the invention will be apparent to those skilled in the art from the following detailed description, taken in conjunction with the drawings and the appended claims.

BRIEF DESCRIPTION OF THE DRAWINGS

FIG. 1 shows a perspective view of an embodiment of a two-panel door in accordance with the invention, wherein the back is a mirror image thereof;

FIG. 2 shows a perspective view of an embodiment of a six-panel door in accordance with the invention, wherein the back is a mirror image thereof;

FIG. 3 shows a horizontal, cross-sectional view through lines 3—3 of FIG. 1 illustrating the details of the concave and convex curves in the faces of the door;

FIG. 4 shows a horizontal cross-sectional view through lines 4—4 of FIG. 2 of a paneled composite door, having perimeter framing and a molded door core component in accordance with the invention;

larger circles having unshaded smaller, inner circles represent pods extending downwardly from the plane of the drawing.

DETAILED DESCRIPTION OF THE INVENTION

Figure 5:
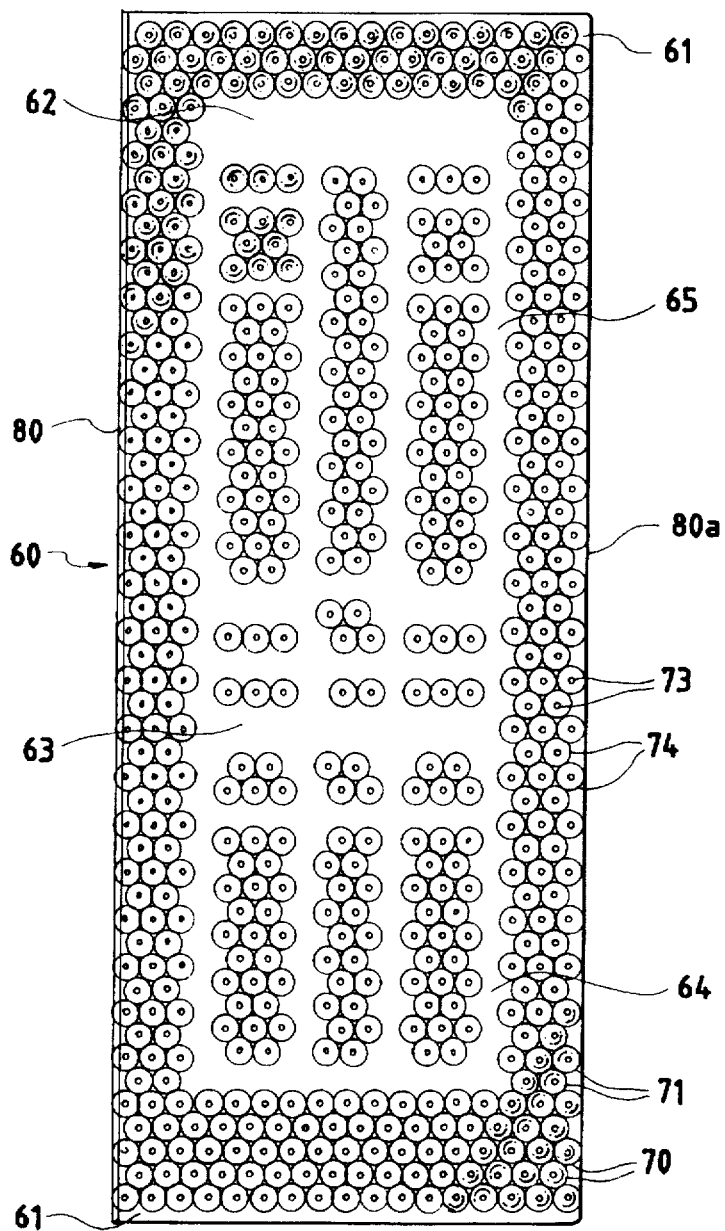
FIG. 5 shows a front plan view of an embodiment of a molded door core component in accordance with the present invention, wherein the larger circles represent the pods or cells of the inventive core component and wherein (a) larger circles having shaded smaller, inner circles represent pods extending outwardly from the plane of the drawing and (b)

According to the invention, a molded core component is provided which can be placed on interior voids or spaces formed by structural or building members, so as to provide beneficial characteristics thereto.

The inventive core component or insert is a consolidated, molded article having various integrally-molded contoured portions which aid in providing beneficial properties to the structural or building member with which the core component is utilized. More specifically, the core component preferably includes a central planar portion or layer and a plurality of pods, protrusions or cells which extend outwardly from (and are molded integrally with) the central planar portion. Each pod includes a contoured wall which extends from, and forms an angle with, the central planar layer.

Preferably, the core component includes both (a) pods which are located above the central planar layer and (b) pods which are located below the central planar layer. In addition the core component can preferably provide for a reduced stress against warpage by having a uniform surface area on each side of the core component. The pods of a given article preferably are of the same size. The top or outermost surfaces of the core component (which are preferably in a plane parallel to the central planar layer) can be attached to an interior surface of an outer assembly, e.g., a doorskin.

In the preferred embodiment, each pod has the shape of a hollow, conical frustum. A frustum is the figure formed when the top of a cone or pyramid is cut off by a plane parallel to the base of the figure. The frustum should have a top surface and should lack a surface at its base (i.e., the end having the largest cross-section).

As used herein, the term building or structural member includes any building article with which it is desirable to include a core component, e.g., those articles which contain a void or space on an interior thereof. For example, it can be desirable to place a core component in the interior voids of any of the following: various types of interior wall members or sections, exterior wall members or sections, partition members or sections, furniture components, vehicle components, packaging components, and many types of doors. Further, it is not necessary that the structural member be completely enclosed around its entire perimeter in order to create a void. The inventive core component can be useful with a structural member which has a void exposed to the atmosphere, but which void will not be visible in the final product. By way of example only, a box lacking one or more of its sides can still define a void. The core component can also act as a backing or enclosing member for a structural member.

The inventive core component is preferably used in conjunction with the manufacture of a door product, and more preferably in the manufacture of a door product using man-made composite fiberboard doorskins. As described above, such doorskin articles are commonly molded from a planar cellulosic mat to include one or more interior depressions along the surface of the article, such as one or more square, rectangular, or curved depressions that do not extend to an outer edge of the article. The molded core component of the invention can compensate for the varying depth of the interior void, caused by the depressions in the doorskin.

Referring to the drawings, and initially to FIG. 1, there is illustrated a door, generally designated with reference numeral 10, which includes a front doorskin 11, and an identical, rear doorskin 11A, secured to opposite major surfaces of a door frame or interior support structure or framing member 20. The member 20, known as a stile, can be made of natural wood, man-made pressed wood, or any other suitable material. The doorskins 11 and 11A are preferably molded so as to impart aesthetic surface contours in the visible outer surfaces that correspond to essentially identical contours of a mold cavity (not shown). The doorskins 11 and 11A are preferably secured, e.g., with an adhesive, to a molded core component in accordance with the invention.

The doorskins shown in the drawings, e.g., FIG. 1, are molded to simulate multi-panel door surfaces. The embodiment shown in FIG. 1 contains two molded depressions 12 and 13 (having curved portions 18, 18A, and 19) which surround two panels 14 and 15. Further, each depression is completely surrounded by planar (e.g., horizontal) door surface portions 16 and 17, lying in a common plane. Preferably, panels 14 and 15 lie in the same plane as the door surface portions 16 and 17; however, this need not be the case.

FIG. 2 illustrates a six-panel door 30 having a rear doorskin 51 and a front doorskin 52 supported by a framing member 53 (e.g., a stile). The door 30 has six rectangular depressions 31, 32, 33, 34, 35, and 36 that are rectangular in shape. The rectangular depressions completely surround six horizontal door panels 41, 42, 43, 44, 45, and 46 which lie in the same horizontal plane as the plane of the doorskin 52. Optionally, the horizontal door panels 41–46 can lie in a horizontal plane different than the plane of the doorskin 52.

In the two-panel door shown in FIG. 1, the depressions have a rectangular shape that have been altered with the curved portions 18, 18A, and 19. Otherwise, the door of FIG. 1 has characteristics similar to the six-panel door shown in FIG. 2.

Referring now to FIG. 3, there is illustrated a horizontal, cross-sectional view through lines 3—3 of FIG. 1. This drawing illustrates some of the details of the curvatures in the faces 11, 11A of the door 10 of FIG. 1. As described above, the doorskins 11, 11A are attached to a stile 20A which is parallel to the stile 20 shown in FIG. 1. As shown in FIG. 3, the doorskins 11 and 11A form an interior space or void 59 therebetween.

In FIG. 3, the depression 12, along with a depression 12A on the rear doorskin 11A, cause the void 59 to have a narrower depth (measured from a point on doorskin 11 along a line perpendicular to the doorskin 11 to a point on doorskin 11A) than the width at other locations of the door of FIG. 3. This point may be referred to herein as a constriction. An object of the invention is to provide a molded core component in the void 59 which can provide sufficient weight properties and sound insulation properties to the final product, while compensating for the constriction at the location of depressions 12 and 12A, for example.

FIG. 4 illustrates a horizontal cross section through lines 4—4 of FIG. 2 of a paneled composite door 101. The paneled door 101 has a top doorskin 102 and a bottom doorskin 102A. The door 101 includes stiles 103 and 103A and a molded door core component, referred to generally by reference numeral 104. The doorskin 102 has contoured depressions 120 and 121 which surround raised panels 122 and 123, respectively. The bottom doorskin 102A, which is a mirror image of the top doorskin 102, has contoured depressions 120A and 121A. Similar to the door portion shown in FIG. 3, the depressions 120 and 120A form constrictions 110 and 111 at the locations indicated in FIG. 4. Similarly, the depressions 121 and 121A form constrictions 112 and 113 at the indicated locations.

The core component 104 includes a central planar portion 130 which extends along a portion of the core component 104. The core component 104 has a number of pods, protrusions or cells 131A through 131J. (The pods may be referred to generically as element 131.) The pod 131A begins at a point A and includes a contoured wall 140 which extends outwardly from the central planar layer 130. In the cross-section of FIG. 4, the wall 140 forms an angle with the plane in which the central planar portion 130 lies. This angle can be referred to as a "draft angle." The acute angle at that location (i.e., the angle on the interior of pod 131A at the point A) is preferably in the range of about 25° to about 45°, more preferably in the range of about 30° to about 38°, and most preferably about 35°. Such an angle preferably allows for nesting of multiple articles for shipment and storage, as further described herein, for example in conjunction with FIG. 7. Such angles also allow for satisfactory pressing of the core component 104. Because FIG. 4 shows a horizontal cross-section, the wall 140 is shown as a line segment; however, because the pod 131A is preferably in the shape of a hollow, conical frustum, the wall 140 has a rounded contour, as indicated by the shading in the figure.

At point B, the pod wall 140 intersects with a top wall 141. The top wall 141 defines the outermost portion of the pod 131 and preferably lies in a plane parallel to the plane of the central planar layer 130. (Referring to FIG. 5, shaded inner circles 73 of pods 70, discussed below, correspond to the top wall 141 in FIG. 4.)

A wall 140A is at an angle to the top wall 141. The wall 140A is the continuation of the wall 140 around the perimeter of the hollow, conical frustum forming the pod 131A. In the embodiment of FIG. 4, at a point C, the wall 140A intersects with a relatively small portion of the central planar layer 130. That portion of the planar layer 130 (which can be larger depending upon the application of the core component) continues until another (oppositely directed) pod 131B begins, similar to the contouring for the pod 131A. With the exception of the direction in which they are oriented, additional pods 131B through 131J are similar in design to the pod 131A.

As shown in FIG. 4, pods are preferably located on both sides of the central plane. However, such an arrangement is not a requirement of the invention. Further, the number of pods is also completely variable depending on the product's intended use.

The height of the pod 131A (as defined above) is preferably substantially equal for all of the pods 131 of a particular core component 104. By way of example only, that height can be about one-half inch (about 1.27 centimeters). The pod 131A (as well as the pods 131B through 131J) preferably has a diameter at or near the point A (the intersection of the central planar portion 130 and the wall 140, which is represented by large circles 74 in FIG. 5) in the range of about 1 inch to about 4 inches (about 2.5 to about 10 centimeters), and more preferably in the range of about 2 inches to about 3 inches (about 5 to about 7.6 centimeters), and most preferably about 2.1 inches (about 5.3 centimeters).

The core component 104 can have a width (measured from the inner edge of the stile 103 to the inner edge of the stile 103A), by way of example only, of about 28 inches (about 75 centimeters) for placement in a door having a width (measured from the outer edge of the stile 103 to the outer edge of the stile 103A) of about 30 inches (about 91 centimeters). The width of the core component 104 is preferably about 2 inches (about 5 cm) less than the width of the door product. The thickness of the pressed material forming the core component 104 is preferably about one-eighth of an inch (about 3.2 millimeters). The total depth of the core component (e.g., the distance along a line perpendicular to the plane of the top wall 141 of the pod 131A extending to the plane of a top wall 142 of the pod 131B) is preferably in the range of about one to about two inches (about 2.54 to about 5 centimeters), and more preferably about 1.1 inch (about 2.8 centimeters). However, all of these measurements are completely variable depending, for example, upon (a) the type of product in which the core component is used, (b) the type of material used to make the core component, and (c) the desired weight and sound insulation properties which are desired.

As stated above, the preferred shape of the pods is a hollow, conical frustum. However, this shape can vary depending upon the intended use of the core component. For example, the edges of the frustum (i.e., at the top and along its base) can be rounded, for example at the points A and B in FIG. 4. Alternatively, the pods can have a horizontal cross section other than a circle (e.g., an oval), or the pods can have the general shape of a paraboloid or a hyperboloid having its top cut off by a plane parallel to the base of the figure. However, the shape of the pod is preferably selected so as to maximize the economy and simplicity of (a) the dies used to press the article, (b) machining of the article, and (c) application of the article to the desired structural component.

Turning now to FIG. 5, there is illustrated an embodiment of a molded core component manufactured in accordance with the invention. The molded core component (referred to generally by reference numeral 60) has outer edges 80 and 80A, and generally includes a central planar portion or layer 61. A multiplicity of pods, protrusions or cells 70, 71 extend from, and are molded integrally with, the central planar portion 61. Each pod, protrusion or cell preferably includes a contoured wall which extends from, and forms an angle (not shown in the view of FIG. 5) with, the central planar layer.

The larger circles in FIG. 5 represent the pods or cells of the inventive core component. More specifically, for each pod 70, 71, a large, outer circle 74 represents the circumference of the pod 70 or 71 at its intersection with the central plane portion 61 (e.g., at the point A in FIG. 4). A smaller, inner circle 73 (on the interior of the larger circle 74) represents the outermost surface of the protruding pod (e.g., the wall 141 in FIG. 4). The outer circles 74 having shaded inner circles 73 represent pods extending outwardly from the plane of the figure, and the circles 74 having unshaded inner circles 73 represent pods extending downwardly from the plane of the figure. In the embodiment of FIG. 5, the upwardly extending pods 70 fall in lines which are at obtuse angles to the edges 80, 80A of the core component article 60. The downwardly extending pods 71 also fall in lines which are at obtuse angles to the edges of the core component article 60. However, this arrangement is not necessary to take advantage of the internal strength of the inventive core component.

Although the core component of FIG. 5 has pods 70, 71 which extend to the edges 80 and 80A of the core component 60, the location of the pods 70, 71 with respect to the edges 80, 80A is completely variable depending upon the type of building component into which the core component 60 will be placed. For example, the first pod from the edge of the core component can be located a few inches from the edge of the core component (as with the pod 136 near stile 103 in the embodiment shown in FIG. 4). Alternatively, it might be desirable to have a portion (e.g., the mid-point) of a pod located right at the edge 80, 80A of the core component 60 (as with the pod 136 near the stile 103A in FIG. 4). In order to manufacture core composite 60 with such a configuration, (a) the core component 60 can be cut (e.g., with a saw) along its longitudinal axis through a pod (e.g., at its mid-point) after molding or (b) the core component 60 can be manufactured with a die set which forms a portion of the pod at the edge 80 in the final product.

Further, although in the embodiment of FIG. 5 all of the pods 70, 71 are shown as having the same size, this arrangement is not required by the invention. It may be desirable, depending upon the intended use of the component and location of the pods, to utilize varying sizes of pods 70, 71 within the same core component 60.

FIG. 5 also serves to illustrate a preferred feature of the invention wherein a single design of the inventive core component can be used in multiple designs of man-made composite doorskins. In FIG. 5, as opposed to (i.e., to the exclusion of) pods 70, 71, the central planar portion 61 is located in areas 62, 63, 64, and 65. The core component 60 can be placed on the interior of a six-panel hardboard doorskin because no pods are formed in the core component 60 in the areas which would correspond to the depressions which outline the panels in a six-panel door, for example, as described above. In these locations where no pods are located, the central planar portion 61 allows the core component 60 to fit in the voids of the doorskins, including the constricted portions thereof, as shown in FIG. 4.

In addition to the planar layer portions 62–65 being able to accommodate the depressions of a six-panel door, the portions 62–65 are preferably at the same time able to accommodate the depressions of various other styles of paneled doors (for example, the depressions 12, 13 in FIG. 1; the depressions 31–36 in FIG. 2; and the depressions 120, 121 in FIG. 4).

Thus, the core component 60 of FIG. 5 can be utilized in conjunction with any doorskin which has no depressions in locations where pods 70, 71 are located. A single, integrated design of core component 60 (e.g., a "master" core component) can be utilized with multiple styles of paneled doorskins. The integration of designs can be accomplished by taking into account all of the desired styles of doors; whenever a particular style of door dictates a "flat zone" (i.e., the central planar layer), the master core component design will be manufactured to have a flat zone at that location (e.g., at locations 62–65).

Figure 6:
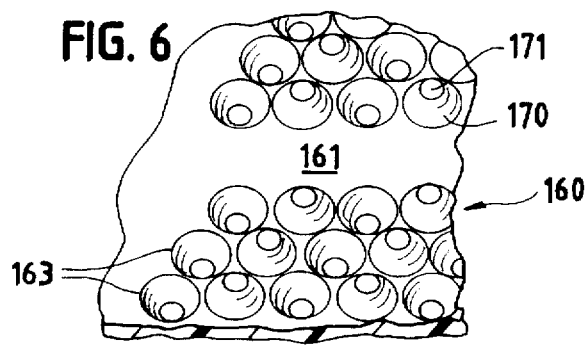
FIG. 6 shows a partial perspective view of a molded core component in accordance with the present invention.

FIG. 6 shows a partial perspective view of a molded core component in accordance with the present invention. FIG. 6 illustrates a molded core component 160 having a central planar portion 161 and pods 163. Similar to the embodiment of FIG. 4, the pods 163 have a pod wall 170 and a top pod wall 171.

The core component generally will have smooth and flat outer surfaces (e.g., the top wall 171). Optionally, the article will have a texture on the portions of the surface (e.g., the top wall 171) which will come into contact with or be glued to the inner surface of a building or construction member (not shown in FIG. 6). In some cases, such a texture can help in the adhesion of the core component 160 to the building or construction member. Further, although the wall 170 is preferably smooth in texture, it may be advantageous to provide a contoured wall, for example, a wall with longitudinal ribs.

It should also be noted that the central planar layer 161 itself is preferably substantially flat or planar, as is shown in FIGS. 4 and 6. However, in some applications the central planar portion 161 can be contoured (apart from the contouring of the pods 163), as long as that contour still allows for placement in a desired interior void. In some articles, e.g., furniture, the central planar layer may be required to be contoured, in order to allow for the shape of the article in which the core component will be placed.

The inventive molded core component preferably has a further feature which will be described in conjunction with FIGS. 4 and 7. This feature will allow multiple units of the molded core components to be stacked or "nested" for simple and economical shipping and storage of the core components. Referring initially to FIG. 4, as described above, the draft angle (formed by the intersection of the wall 140 with the plane in which the central planar layer 130 lies) is preferably in the range of about 25° to about 45°, more preferably in the range of about 30° to about 38°, and most preferably about 35°. Such an angle preferably allows for the a large area of contact between adjacent articles, as illustrated in FIG. 7.

Figure 7:
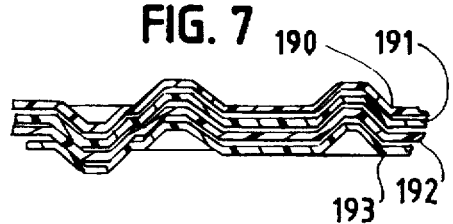
FIG. 7 shows a side view of a plurality of molded core components of the invention, illustrating the nesting feature of the invention.

The nesting feature is illustrated in FIG. 7, wherein a top core component 190 is stacked on top of a middle core component 191, which in turn is stacked on top of two additional core components 192 and 193. The stacked core components preferably have substantially complete face to back contact along their entire lengths.

As described in the copending application Ser. No. 262, 472 filed Jun. 20, 1994, the disclosure of which is incorporated herein by reference, in conjunction with the nesting feature, the lateral wall (e.g., the wall 140 in FIG. 4) of the core component preferably has a thickness or caliper which is slightly less than the thickness of the adjacent planar portions (e.g., the central planar layer 130 and the top wall 142 in FIG. 4). Preferably, the lateral wall 140 has a thickness which is about 2 to about 20 percent (more preferably about 10 to about 15 percent) thinner than the central planar layer 130. The lateral wall 140 preferably has a thickness which varies by less than about 20 percent along its length. In a preferred example, the central plane has a thickness of about 0.117 inch and the lateral wall has a thickness of about 0.111 inch. Such a design will preferably facilitate pressing of the article and will facilitate the ability of multiple articles to nest.

The nesting feature facilitates shipment and storage of multiple articles. A fully nested pallet of molded articles reduces the volume being shipped by eliminating a considerable portion of the space normally required when numerous articles are stacked for shipment which do not include this feature of the invention. A full thickness core component not including this feature generally requires 1⅛ inch of height for each core (assuming the core has surfaces which are molded at a thickness of ⅛ inch and an overall height of about 1⅛ inch). For example, two full thickness cores will require about 2¼ inch stacking height, and three full thickness cores will require about 3⅜ inch stacking height. By comparison, a core component including the nesting feature of the invention will preferably require about 1⅛ inch stacking height for one article, and about 1¼ inch (i.e., 1⅛ inch plus the ⅛ inch thickness of the second article). The stacking height required for three of the inventive core components will preferably be about 1⅛ inches. By reducing the stacking height, significant overall container volume reductions can preferably be achieved. The nesting feature will also help reduce or eliminate surface damage to the core component during transportation.

Further, such a feature will add the following additional benefits: (1) improved shipping and warehousing safety through better stacking stability, for example by reducing the potential for tipping or falling as handled in inventory and (2) reducing packaging costs by improving surface-to-surface stacking stability, thereby the units become interlocking. Additional beneficial features and properties achieved with such a nesting feature are described in the aforementioned copending application Ser. No. 262,472 filed Jun. 20, 1994.

A preferred method of manufacturing a man-made door product with a molded core component from fiberboard materials by the inventive process will now be described. It should be understood, however, that, as described above, the inventive treatment is applicable to processes for the manufacture of final products other than composite doors. In addition, the inventive core component can be used in conjunction with a door body made of materials other than fiberboard. Further, the cellulosic material of which the core component itself is made is variable depending upon its intended use. Suitable types of fiberboard material include hardboard, and oriented strandboard, as well as the other materials described above.

Still further, although the process described below is a dry process, the invention is not so limited, and the cellulosic core component can be made by a wet or wet-dry processes, for example. However, as will be understood by those of skill in the art, if a wet-felted process is utilized, it may be necessary to alter various of the process parameters (e.g., the amount and type of binder, press time, and/or press temperature) to compensate for that different process.

A preferred dry process begins by first providing a suitable cellulosic filler, for example wood fiber having a moisture content of less than about 50 weight percent, based on the weight of dry fiber. The wood fibers are conveyed in a gaseous stream or by mechanical means to a location where the fiber is blended with a suitable thermosetting resin binder.

Any of the processes known in the art can be used to blend the wood fiber with the binder resin, including blowline feeding of the wood fiber and binder resin. For example, the cellulosic fibers may be first coated with the thermosetting resin binder by blowline addition; wherein, air turbulence causes the binder to disperse onto the fibers. The resin-coated fibers are randomly formed into a mat by air blowing the coated fibers onto a support member to form a mat. The mat can optionally be subjected to a step, e.g., including heating, to cause a portion of the water in the fiber to evaporate.

A dry mat preferably has a moisture content of less than about 30 weight percent, and more preferably less than about 10 weight percent, based upon the dry weight of the fibers.

The amount of binder resin used in the process is generally less than 20 weight percent, but can vary depending upon the other process parameters and intended use of the final product. However, the binder resin is preferably used at about 0.5 to about 5 weight percent, and more preferably about 1 to about 3 weight percent, based upon the weight of the fibers. However, the amount is variable depending upon the other process parameters and desired final product.

Numerous useful binders for the manufacture of fiberboard are known in the art, and include various modified and unmodified phenol-formaldehyde and urea-formaldehyde resins. Various modifiers can be added to the binder resin, as known in the art, for example, wax size, which is preferably added at less than about 4 percent, based on the weight of the binder.

The dry mat comprising wood fiber and binder resin preferably has a thickness of about two inches; however, this thickness is variable depending upon the thickness of the consolidated product, the type of cellulosic material being used, and pressing conditions, as well as the other process parameters. The mat is then placed into a consolidating press.

In order to produce a product having the configuration shown in FIG. 6, for example, the consolidating press should have a shape which provides for the contouring of the mat to form a central planar layer and one or more pods or cells extending outwardly therefrom, as described above in detail.

Once placed in the press, the mat is molded under heat and pressure. The press temperature is preferably in the range of about 275° F. to about 550° F. (and more preferably about 390° F. to about 450° F.), and the press pressure is preferably in the range of about 400 psi to about 850 psi (and more preferably 600 psi to about 800 psi). The press time is generally in the range of about 20 seconds to about 20 minutes (and more preferably in the range of about 30 seconds to 90 seconds). However, it should be understood that these conditions are variable depending upon the desired final product and that those of skill in the art will be able to make modifications based upon the desired final product. When exposed to this heat and pressure, the thermosetting resin will be cured and the mat will be compressed into an integral consolidated structure.

Where a pre-existing process for the production of flat fiberboard sheets, for example, is available to the user desiring to manufacture the inventive core component, in order to maximize the economy of the inventive process, the process used to manufacture the core component (in particular, the process used to form a mat ready for pressing) is preferably adapted from the pre-existing process. The ability to adapt already-existing processing will help avoid the increased costs associated with having to set up an entirely different process, particularly for forming a mat ready for pressing. However, as described herein, the press utilized to manufacture the inventive molded core components will necessarily differ from the existing equipment used to manufacture flat fiberboard sheets.

Once the inventive molded core component has been produced, it preferably will be assembled along with two doorskins and framing structure, in order to produce a final door product in accordance with the invention. Referring once again to FIG. 4, the core component 104 is adhered or glued to the doorskins 102 and 102A and framing members or stiles 103, 103A with any suitable bonding adhesive known to those of skill in the art. Preferred adhesives include, for example, casein or polyvinylacetate ("PVA") and their derivatives. The adhesive is preferably placed at all locations where the doorskin 102 and/or the framing member 103 comes into contact with the core component 104. Once the core component 104 is glued to the first doorskin 102, the second doorskin 102A is then attached to both the component 104 and stiles 103, 103A in the same manner as the first doorskin. At the top and bottom of the door 101, the core component 104 can be glued to the rail pieces (not shown), but this is not necessary.

After the door product has been assembled, it can be subsequently transported for shipment and sale.

As described above, the inventive core component preferably provides a door product or other building components, with beneficial weight and sound insulation properties. The core component preferably provides substantial structural stability. For example, a door made comprising fiberboard doorskins and the inventive core component will preferably have the same feel and ability to swing shut (e.g., as a result of a desirable weight) as a natural wood door, e.g. made of pine. Further, the sound insulation properties of the door are preferably greatly improved over the properties of a similar door which lacks the inventive core component.

The articles described herein are most preferably formed from a substrate that includes at least one layer of cellulosic fiber and a binder (e.g., a fiberboard mat and a resin binder), or cellulosic wood particles and a resin binder. However, similar articles to those specifically described herein can be formed by contouring (e.g., by molding or extruding) other materials from thermoplastic or thermosetting polymers, e.g., polyethylene or polypropylene with or without reinforcing fibers, such as fiberglass or cellulosic materials. Thus, articles made from other materials can incorporate the features of the core component, including the nesting capability, for example, as described herein for cellulosic articles.

However, it should be kept in mind that the material for the core component should be selected depending, for example, on the desired application of the core component. For example, some materials will be more extensible and/or flexible, while having less internal strength. Other materials, such as many fiberboard materials, will have a high internal strength relative to other products (e.g., many polymers and plastics), but might have a relatively lower extensibility and/or flexibility. When the core components described herein are manufactured with a fiberboard material, a high-strength article suitable for many types of structural components can be produced.

For many applications, a core component made from a composite cellulosic material (e.g., fiberboard) will be preferred over various polymers or plastics, for example, due to a potential advantage of the strength of the final product on a per unit cost basis.

The foregoing description is given for clearness of understanding only, and no unnecessary limitations should be understood therefrom, as modifications within the scope of the invention will be apparent to those skilled in the art.

We claim:

1. A contoured, integrally-molded article useful as a core component for a structural member, comprising:

(a) a substantially planar layer portion; and (b) a plurality of contoured portions integral with, and projecting outwardly from, said layer portion, said contoured portions defining a plurality of contoured pod members;

wherein each of said pod members (1) defines a void on an open interior thereof and (2) is spaced apart from contours forming the other pod member(s) by a section of said planar layer portion.

2. The article of claim 1, wherein:

said article is a consolidated, man-made wood article comprising at least 90 weight percent cellulosic material and sufficient binder to adhere the cellulosic material together into a structurally sound member.

3. The article of claim 2, wherein:

said cellulosic material comprises wood fiber and said binder is a thermosetting resin binder selected from the group consisting of modified and unmodified phenol-formaldehyde resins, modified and unmodified urea-formaldehyde resins, and mixtures thereof.

4. The article of claim 1, wherein said substantially planar layer portion lies in a plane and has an upper layer surface, and wherein:

each of said pods includes a lateral wall having an upper lateral wall surface, said lateral wall intersecting said layer portion; and said upper lateral wall surface is integral with said upper layer surface.

5. The article of claim 4, wherein:

said lateral wall and said layer plane define an angle, from horizontal, in the range of about 25° to about 45°.

6. The article of claim 5, wherein:

said angle is in the range of about 30° to about 38°.

7. The article of claim 6, wherein:

said angle is about 35°.

8. The article of claim 1, wherein: each of said pods is in the shape of a hollow, conical frustum having a top pod wall and lacking a base; and the bottom of said frustum intersects with said layer portion.

9. The article of claim 8, wherein:

said top pod wall has a texture, for facilitating bonding to a structural member.

10. The article of claim 1, wherein said substantially planar layer portion has an upper side and a lower side, and further comprising:

at least one pod member disposed upwardly from said layer portion; and at least one pod member disposed downwardly from said layer portion.

11. The article of claim 1, wherein said pod members comprise:

(a) a curved lateral wall having a bottom end thereof integral with said central layer portion and a top end thereof opposite said bottom end, the horizontal cross section of said curved lateral wall substantially defining a circle;

(b) a top pod wall integral with said top end of said lateral wall, said top pod wall lying in a plane substantially parallel to said substantially planar layer portion; and (c) an opening to said void at the bottom end of said pod member, said opening being defined by the intersection of (1) the bottom of said lateral wall and (2) said layer portion.

12. The article of claim 1, wherein:

said substantially planar layer has a thickness of about one-sixteenth inch to about one-quarter inch (about 1.6 to about 6.35 millimeters).

13. The article of claim 12, wherein:

said substantially planar layer has a thickness of about one-eighth inch (about 3.2 millimeters).

14. A structural member comprising the article of claim 1.

15. The structural member of claim 14, wherein:

said structural member defines an interior void; and said integrally-molded article is attached on said interior with a binder.

16. The structural member of claim 14, wherein the structural member is selected from the group consisting of interior wall members, exterior wall members, partition wall members, furniture components, vehicle components, packaging components, and doors.

17. A contoured, integrally-molded article useful as a core component for a structural member, comprising:

a central planar layer surrounding a plurality of integral depressions, each of said depressions having within the depression (1) a lower planar wall substantially parallel to said central planar layer, and (2) an inclined wall integral with both the upper and lower planar walls at the ends of said inclined wall;

said inclined wall having an upper surface integral with an upper surface of said upper and said lower planar walls, said inclined wall being contoured to have a circular cross section, said cross-section being horizontal and parallel to said central planar layer.

18. A molded article of manufacture capable of nesting, one article above another, for transport and/or storage without significant damage, said article comprising:

a central planar layer surrounding an integral depression, said depression having within the depression (1) a lower planar wall substantially parallel to said central planar layer, and (2) an inclined wall integral with both the upper and lower planar walls at the ends of said inclined wall;

said inclined wall having an upper surface integral with an upper surface of said upper and lower planar walls, said inclined upper surface being contoured to have a circular cross section, said cross-section being horizontal and parallel to said central planar layer;

said inclined wall being inclined at an angle of 25° to about 45° from said lower planar wall, and having a thickness that varies 20% or less relative to a mean thickness of said inclined wall between said upper and lower planar walls.

19. The article of claim 18, wherein said inclined wall has a thickness that is about 1% to about 12% smaller than a thickness of said central planar layer and said lower planar wall.

20. The article of claim 18, wherein the thickness of said inclined wall, over a span between upper and lower ends of said inclined wall, within said molded depression, varies about 20% or less, in relation to a mean thickness of said inclined wall span; and said mean thickness over said inclined wall span is about 2% to about 15% smaller than a thickness of an adjacent, integral planar wall, said inclined wall being thinner at upper and lower ends of said inclined wall span than said mean thickness of said inclined wall span.

21. The article of claim 18, wherein:

said article is a consolidated, man-made wood article comprising at least 80 weight percent cellulosic material and sufficient binder to adhere the cellulosic material together into a structurally sound member.

22. A man-made composite wood door made from consolidated cellulosic material, comprising:

(a) a doorskin face and a doorskin back, each of said doorskins having an inner surface and an outer surface, and wherein said doorskins form a door body and define an interior space therebetween; and (b) a core component located in said interior space and including consolidated cellulosic material and sufficient binder to adhere the cellulosic material together into a structurally sound member, said core component comprising:

(1) a central planar layer disposed in said interior space; and (2) a plurality of contoured portions integral with, and projecting outwardly from, said central planar layer, said contoured portions defining a plurality of contoured pod members, each of said pod members being spaced apart from the other pod member(s) by a section of said central planar layer.

23. The composite door of claim 22, wherein said central planar layer has an upper side and a lower side, and wherein:

at least one pod member is disposed upwardly from said layer portion; and at least one pod member is disposed downwardly from said layer portion.

24. The composite door of claim 22, wherein:

said inner surface of said doorskin is in contact with said pod members.

25. The composite door of claim 22, wherein said doorskin face and doorskin back each comprise:

a planar doorskin wall; and a plurality of molded depressions in said doorskin wall, said depressions including an inclined wall having a contoured upper surface integral with an upper surface of said doorskin wall, said inclined wall extending downwardly from said doorskin wall toward a bottom wall of said depression and said bottom wall having an upper surface integral with a lower end of said inclined wall surface.

26. The composite door of claim 25, wherein:

said doorskins include a plurality of said depressions simulating a multi-panel door surface.

27. The composite door of claim 26, wherein:

a segment of the central planar layer is located in the void adjacent said depression.

28. A method for the preparation of a man-made molded wood article useful as a core component for a structural member, comprising:

(a) combining a cellulosic filler and a binder resin;

(b) forming the product of step (a) into a mat;

(c) placing said mat into a contoured mold cavity;

(d) compressing said mat in said cavity, to subject the mat to sufficient heat and pressure in the mold cavity to contour upper and lower surfaces of the mat to correspond in shape to the contours of the mold cavity and to bind the composite layer together; and (e) molding said mat in said mold cavity to include (1) a central planar layer and (2) contoured portions defining a plurality of contoured pod members disposed outwardly from, and formed integrally with, said central planar layer, wherein each of said pod members is spaced apart from contours forming the other pod member(s) by a section of said central planar layer.

29. The method of claim 28, wherein:

the resin binder is included in the mat in an amount of about 1% to about 15%, based on the total dry weight of the mat.

30. The method of claim 28, wherein:

said process is a dry process, wherein the mat formed in said step (b) is a dry mat having a moisture content of less than about 10 weight percent, based on the weight of cellulosic material.

31. The method of claim 28, wherein:

said cellulosic filler comprises fibrillated cellulosic fibers.

32. The article of claim 1, wherein said core component is adapted to be inserted into a structural member having an internal void which has a dimension such that the depth of the void varies at two or more locations thereof, and wherein:

said pods are located in a predetermined arrangement to accommodate said two or more variations in depth; and said arrangement is adapted so that said article is able to be alternatively inserted into at least two different styles of structural members having different internal void dimensions.

33. The article of claim 32, wherein:

said core component having a given arrangement is able to be alternatively inserted into the interior void formed by any of the following doorskins: two-panel doorskins, three-panel doorskins, four-panel doorskins, five-panel doorskins, and six-panel doorskins.

* * * * *